United States Patent [19]

Bidlack et al.

[11] 3,742,154

[45] June 26, 1973

[54] CONTINUOUS INBAND TESTING OF TRUNKS WITH AUTOMATIC TRUNK SUBSTITUTION UPON DETECTING A DEFECTIVE TRUNK

[75] Inventors: Richard Henry Bidlack, Boonton, N.J.; William John McKelvey, Boulder, Colo.; James Alan Rezelman, Spring Lake Heights, N.J.

[73] Assignee: Bell Telephone Laboratories, Incorporated, Murray Hill, N.J.

[22] Filed: Dec. 30, 1971

[21] Appl. No.: 214,139

[52] U.S. Cl. .......... 179/175.3

[51] Int. Cl. .......... H04b 3/46

[58] Field of Search .......... 179/175.3, 175.2 R, 179/175.2 C; 178/69 A

[56] References Cited

UNITED STATES PATENTS

| | | | |
|---|---|---|---|
| 2,680,162 | 6/1954 | Brehm et al. | 179/175.3 |
| 3,155,772 | 11/1964 | Gibby et al. | 178/69 A |
| 3,364,468 | 1/1968 | Haibt et al. | 179/175.3 |
| 3,364,467 | 1/1968 | Haibt et al. | 179/175.3 |
| 3,423,539 | 1/1969 | Page et al. | 179/175.2 R |
| 3,409,877 | 11/1968 | Alterman et al. | 179/175.2 R |
| 2,666,099 | 1/1954 | Bonner | 179/175.3 |

*Primary Examiner*—Kathleen H. Claffy
*Assistant Examiner*—Douglas W. Olms
*Attorney*—W. E. Keefauver

[57] ABSTRACT

The integrity of a dedicated trunk is checked by providing equipment for periodically transmitting inband test signals in both directions over the trunk. Each of the test signals is a 2,400 Hz signal periodically transmitted over the trunk from the near end. Equipment at the far end responds by returning a 2,600 Hz acknowledgment pulse over the trunk. Filters at both ends of the trunk prevent interference of the test signals with the voice frequency communications thereon. A counter at the near end of the trunk is initialized for each test signal transmitted to the far end and is blocked from counting by each acknowledgment signal returned over the trunk. Upon transmitting two successive test signals to the far end and not receiving acknowledgment signals, the counter is incremented to the count of two and controls an automatic transfer of the voice frequency communications on the dedicated trunk to a spare trunk the integrity of which is similarly checked.

8 Claims, 6 Drawing Figures

CONTINUOUS INBAND TESTING OF TRUNKS WITH AUTOMATIC TRUNK SUBSTITUTION UPON DETECTING A DEFECTIVE TRUNK

FIELD OF THE INVENTION

This invention relates to automatic testing of trunks and particularly to equipment for automatically testing a dedicated trunk and substituting a spare trunk in the event of transmission failure over the tested dedicated trunk.

BACKGROUND OF THE INVENTION

Dedicated trunk facilities are used to maximum advantage by organizations, such as governmental agencies, which utilize the facilities rather extensively or which require that the facilities be available at all times for their exclusive use. One such agency is the Federal Aviation Administration (FAA) which regulates and controls air traffic in the United States. In order to control air traffic, the FAA has established a number of strategically located flight control centers, each of which has responsibility for the aircraft in its area. Each such center is staffed by a number of controllers, one or more for each of a number of sectors in the area for which the center is responsible. Each controller works at a controller console and is responsible for a number of aircraft within a sector. In performing their jobs, the controllers are in frequent communication with the aircraft under their control by means of radio transmitters and receivers located at a number of remote sites which are connected to a controller console by a dedicated trunk. The integrity of the air-ground communications system, including the dedicated trunks, must be maintained for a loss of communications between a controller and the aircraft under his control for more than several seconds might be disastrous.

A deficiency exists in the prior art of maintaining the integrity of the FAA systems in that no facilities have priorly been available for automatically detecting a defective dedicated trunk and automatically substituting an operative spare trunk therefor. In the prior art, a controller senses a trouble only after a period of communication impairment or interruption. Thereupon, the controller reports the trouble to the maintenance personnel who conduct manual tests to locate the trouble. If a trunk is found to be defective, a spare trunk is manually substituted for the defective one.

Thus, it is apparent from the foregoing that a need exists for automated equipment to eliminate the necessity for human trouble sensing as well as manual testing and trunk substitution, which have proven to be undesirably time consuming and tend potentially to impair public safety and property.

SUMMARY OF THE INVENTION

The foregoing deficiency and need are fulfilled by an illustrative embodiment of our invention. We provide equipment that automatically performs continuous inband testing of all dedicated trunks, including the spare trunks, between a control center and remote sites. The detection of a defective trunk causes a maintenance alarm to be given and the automatic substitution of a working spare trunk for a defective one.

We accomplish the continuous inband testing with exemplary equipment including 2,400 Hz and 2,600 Hz generators, and single frequency (SF) tone receivers at each end of a dedicated main ("on-line") and a spare ("off-line") trunk. Test signal generators at the near end of the main and spare trunks cause a continual series of periodic pulses of 2,400 Hz to be concurrently applied to the transmit path of each of the trunks which, if the trunks are functioning properly, are detected and filtered from the transmission paths at the far end of the trunks by SF receivers. In response to the satisfactory receipt of each periodic pulse at the far end of each trunk, a 2,600 Hz pulse is returned over the receive path of each trunk by an acknowledgment signal generator. Each acknowledgment signal pulse is detected and filtered from the transmission paths at the near end of the trunks by SF receivers.

At the near end of each trunk we advantageously provide an integrity check circuit that contains a counter. The counter is primed to be incremented to a count of one upon transmission of each 2,400 Hz pulse test signal and incrementation of the counter is canceled by the receipt of the acknowledgment signal within a timed period defined by the test pulse. In the absence of a received acknowledgment signal, the counter is incremented. When, in response to a second test signal, an acknowledgment signal is not received the counter is again incremented to a count of two and generates an alarm signal to alert the maintenance personnel of trouble and to identify the defective trunk. Thus, the maintenance personnel need not test to determine whether an interruption of communications between a controller and a remote site is caused by a defective trunk. They immediately know whether or not the trunk is defective and can more efficiently use their time in repairing the trouble.

An alarm signal from the counter in the integrity check circuit associated with the main trunk advantageously initiates automatic procedures for substituting the operative spare trunk for the defective main trunk. Equipment at the near end automatically operates in response to the alarm signal to substitute the spare trunk for the defective trunk. To accomplish automatic trunk substitution at the far end of the trunks, our equipment advantageously transmits over the spare trunk a special sequence of TOUCH-TONE[R] digits from a transfer signal generator to operate automatic transfer equipment at the far end. The sequence of TOUCH-TONE digits guarantees that spurious signals on the spare trunk do not inadvertently initiate trunk substitution at the far end of the trunks. Upon trunk substitution at the far end of the trunks, another acknowledgment signal is returned over the spare trunk to the near end. In the event the latter signal is not routinely received, a second trial is made to accomplish the desired automatic trunk substitution by repeating the transmission of the TOUCH-TONE digits to the far end of the spare trunk. If the second attempt at trunk substitution fails, the trouble is most likely in the terminal equipment at the near or far end of the trunks and another alarm is given to alert the maintenance personnel.

By having automatic substitution of a working spare trunk for a defective main trunk, the period of interrupted communication between a controller and the aircraft under his control due to a defective trunk is substantially reduced. The controller has a working trunk in a matter of seconds rather than the minutes heretofore required for manual substitution made by the maintenance personnel.

Once a trouble condition in he main trunk is cleared, a key is manually operated to initiate trunk resubstitution. In response to the operation of the key, substitution of the main trunk for the spare trunk is accomplished at the near end. In addition, a TOUCH-TONE digit is transmitted to the far end over the spare trunk to effect substitution thereat. Upon receipt of this digit at the far end, the main trunk is substituted for the spare trunk. Thereafter, a verification tone signal is returned to the near end, in the absence of which an alarm is given to alert the maintenance personnel of failure to resubstitute.

BRIEF DESCRIPTION OF THE DRAWING

Our invention will become more apparent upon consideration of the following description of a specific exemplary embodiment shown in the drawing in which:

In FIGS. 1 to 4, the equipment has been given alphabetic or numeric designations which are prefixed by a single digit indicating the Figure in which the equipment is located. Illustratively, the first 2 in the numerical designation 212 identifies a ramp generator circuit. Those designations, with the prefix 1, given to equipment blocks shown in FIG. 1 are used in FIGS. 2 through 4 to identify the corresponding equipment blocks in the schematic diagram.

Figure 1:
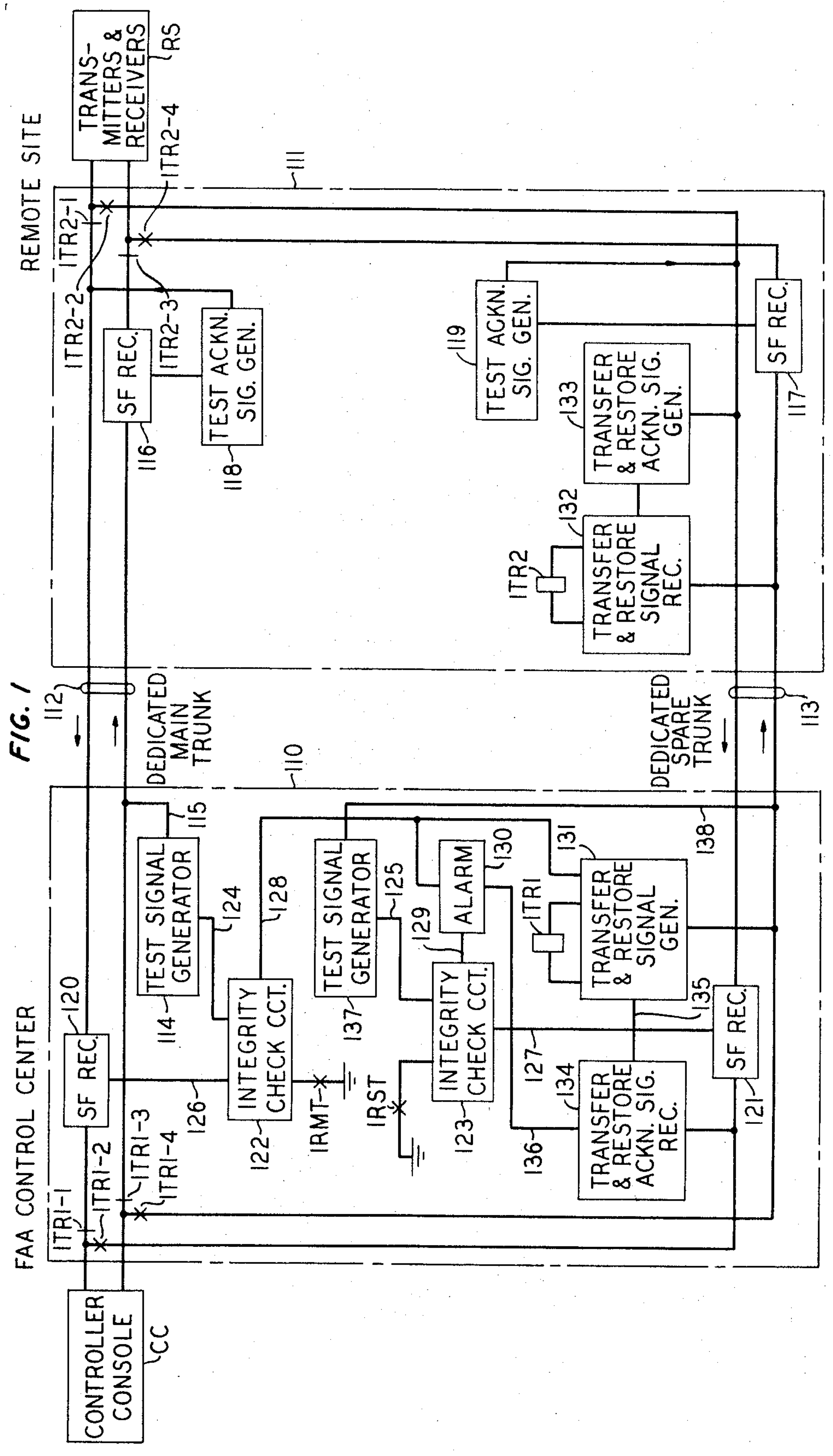
FIG. 1 is a block diagram showing the interrelationship of the various components of an illustrative FAA system and for providing continuous periodic testing of dedicated trunks and automatic trunk substitution in the case of a failure.

The drawing shows only those details which are necessary for complete understanding of our invention. Other equipment elements are shown only in block diagram form inasmuch as the details thereof form no part of our invention. Illustratively, the signal frequency receivers 120 and 121 may be of a design disclosed in U.S. Pat. No. 2,642,500 issued June 16, 1953 to W. W. Fritschi et al., and also described in the *Bell System Technical Journal*, "Inband Single Frequency Signaling," Vol. 33, 1954.

GENERAL DESCRIPTION

Referring now to FIG. 1, there is shown a general block diagram of the automatic inband trunk testing and trunk substitution equipment 110 and 111 in accordance with our invention. Main trunk 112 is a dedicated 4-wire trunk over which voice frequency communications are carried between a near end controller console CC and a remote site RS while a spare 4-wire trunk 113 is connected to be an alternate communication path when equipment 110 and 111 detect trouble in main trunk 112. Equipment 110 at the near end of trunks 112 and 113 performs near end testing and the substitution of trunk 113 for trunk 112. Equipment 111 at the far end of trunks 112 and 113 acts in response to signals from the controlling equipment 110 to perform far end testing and trunk substitution.

Test signal generators 114 and 137 in equipment 110 concurrently generate periodic inband 2400 Hz test pulses on leads 115 and 138 for transmission over trunks 112 and 113. At equipment 111, SF receivers 116 and 117 detect each 2,400 Hz test pulse and cause test acknowledgment signal generators 118 and 119 to return a 2,600 Hz acknowledgment signal over trunks 112 and 113 respectively. At equipment 110, the acknowledgment signals are detected by SF receivers 120 and 121 for checking the integrity of trunks 112 and 113 as described hereinafter.

SF receivers 116, 117, 120 and 121 each filter the respective 2,400 Hz or 2,600 Hz pulses from the transmission paths to prevent interference with voice frequency communications that pass therethrough. The use of different frequencies for the test and acknowledgment signals prevents an undesired short or shunt transmission path between the transmit and receive paths of trunk 112 or 113 from returning the test signal to equipment 110 at the near end and having it interpreted as an acknowledgment signal.

Concurrent with the generation of test signals, generators 114 and 137 each provide a 200 millisecond pulse over leads 124 and 125 to a respective one of integrity check circuits 122 and 123. Integrity check circuits 122 and 123 each have a counter (not shown) primed to be incremented by the pulse on leads 124 and 125. The incrementation is blocked, however, in response to the receipt of the acknowledgment signals from trunks 112 and 113. The acknowledgment signals activate SF receivers 120 and 121 to apply signals over leads 126 and 127 to block incrementation of the counters in check circuits 122 and 123. When trouble arises with signal transmission over either trunk 112 or 113 which prevents a reception of the acknowledgment signal, the counter in the appropriate one of circuits 122 or 123 associated with the defective trunk is incremented to the count of one. Following the generation of a second test signal with no acknowledgment signal being received over the defective trunk, the counter in the particular circuit 122 or 123 is incremented to the count of two for causing an output on the respective output lead 128 or 129. The output on lead 128 or 129 energizes common alarm circuit 130 to alert maintenance personnel of a defective trunk. In the event trunk 113 is defective, normal communications and testing continue on trunk 112. When trunk 112 is found to be defective, testing continues on trunk 113 and automatic trunk substitution is initiated under control of transfer and restore signal generator 131 and in response to the alarm signal on lead 128.

To accomplish automatic transfer of the communication path from trunk 112 to trunk 113 at the control center end, generator 131 operates a switching relay 1TR1 of which break contacts 1TR1-1 and 1TR1-3 open the communication path at the near end of trunk 112 and make contacts 1TR1-2 and 1TR1-4 transfer the communication path to trunk 113. In addition, generator 131 transmits a coded inband transfer request signal consisting of a sequence of TOUCH-TONE digits over trunk 113 to equipment 111 to activate transfer signal receiver 132 which operates a switching relay 1TR2. The operation of relay 1TR2 causes its break contacts 1TR2-1 and 1TR2-3 to open the communication path toward trunk 112 and make contacts 1TR2-2 and 1TR2-4 transfer the communication path to trunk 113. Operated relay 1TR2 also causes receiver 132 to energize transfer acknowledgment signal generator 133 to return a transfer acknowledgment signal over trunk 113 to equipment 110 where it is detected by transfr acknowledgment signal receiver 134. Thereafter, communications are carried over trunk 113 until the defect in trunk 112 is cleared and the system is manually restored to normal.

We advantageously include equipment for effecting the retransmission of the trunk transfer signal over trunk 113 in the event the transfer acknowledgment signal is not received by receiver 134 of equipment 110 until a prescribed time after transmission of the initial transfer signal. Alarm circuit 130 is energized by receiver 134 in the event a transfer acknowledgment signal is not received in response to the second transfer signal to alert maintenance personnel of a failure to transfer.

After the trouble on trunk 112 is cleared, key 1RMT is operated by maintenance personnel to effect the release of alarm circuit 130 and a resubstitution of trunk 112 for trunk 113. The operation of key 1RMT clears the counter in check circuit 122 to remove the trouble signal from lead 128 that energized alarm circuit 130. The removal of the trouble signal from lead 128 also results in generator 131 releasing relay 1TR1 and the transmission of a restore signal over trunk 113 to receiver 132 of equipment 111. Receiver 132 responds to the restore signal by releasing relay 1TR2 and energizing generator 133 which returns a restore acknowledgment signal over trunk 113 to receiver 134 of equipment 110. With relays 1TR1 and 1TR2 released, the communication path is transferred via contacts break contacts 1TR1-1 and 1TR1-3 and 1TR2-1 and 1TR2-3 back to trunk 112. If the restore acknowledgment signal is not received, receiver 134 energizes lead 136 to operate alarm circuit 130 for alerting maintenance personnel of a failure to transfer the communication path back to trunk 112.

DETAILED DESCRIPTION

PERIODIC TESTING OF IDLE AND BUSY TRUNKS

Figure 2:
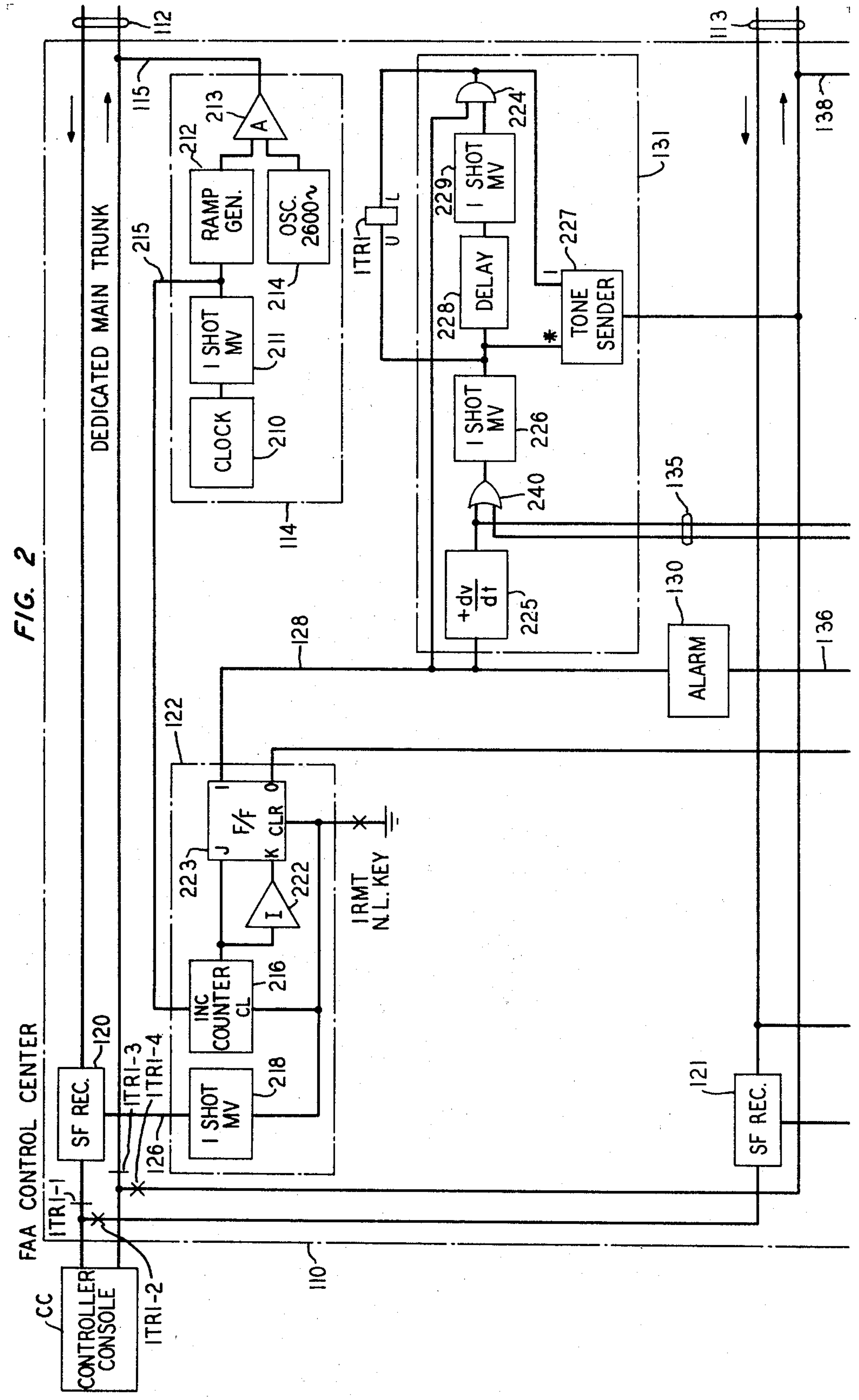
FIGS. 2 and 4 are schematic diagrams of the inband testing and automatic trunk substitution equipment including automatic trunk transfer and trunk restoral at a near end FAA control center.
Figure 3:
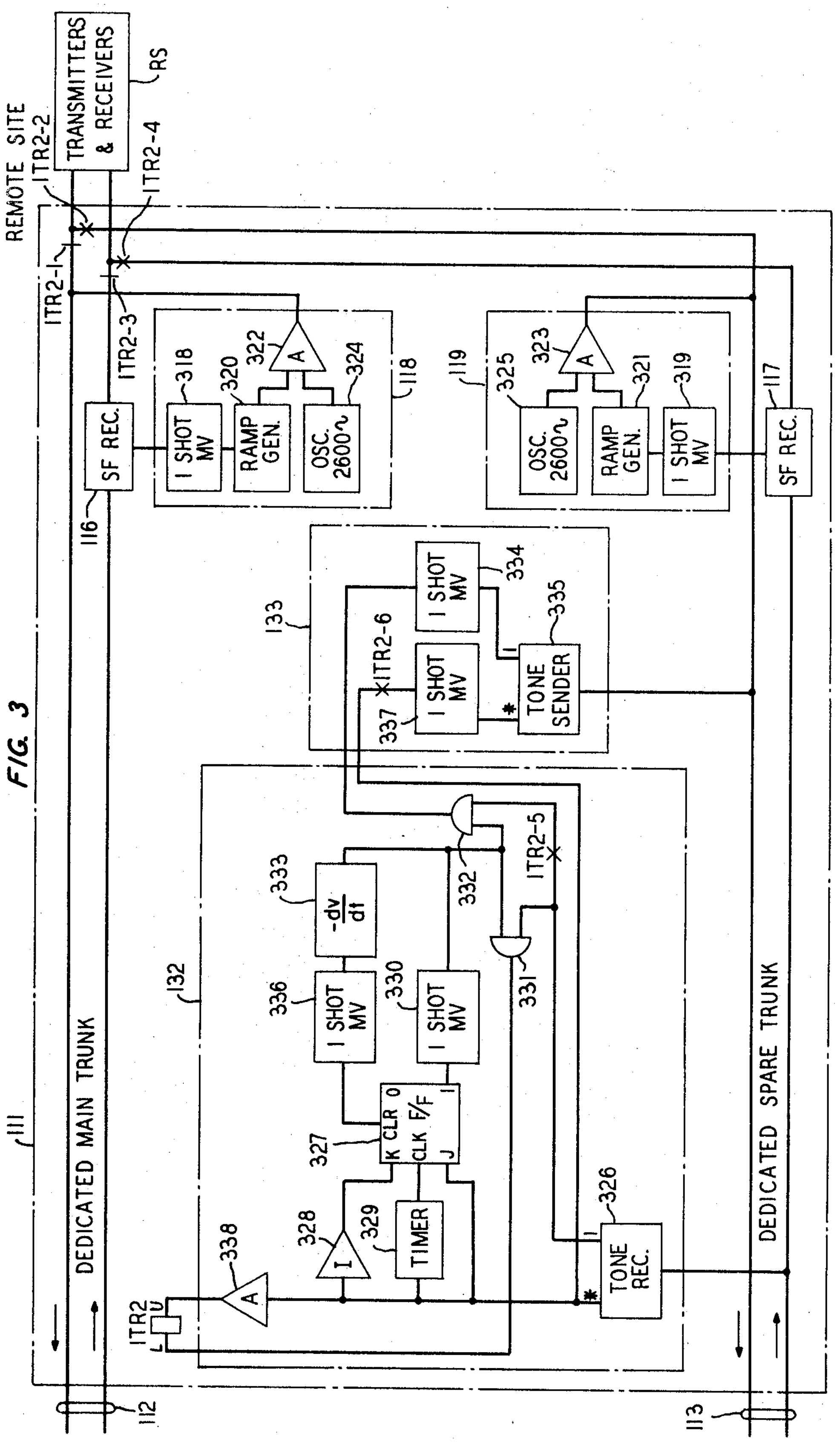
FIG. 3 is a schematic diagram of the inband testing and trunk substitution equipment including automatic trunk transfer and trunk restoral equipment at a far end or remote FAA transmitter and receiver site.
Figure 4:
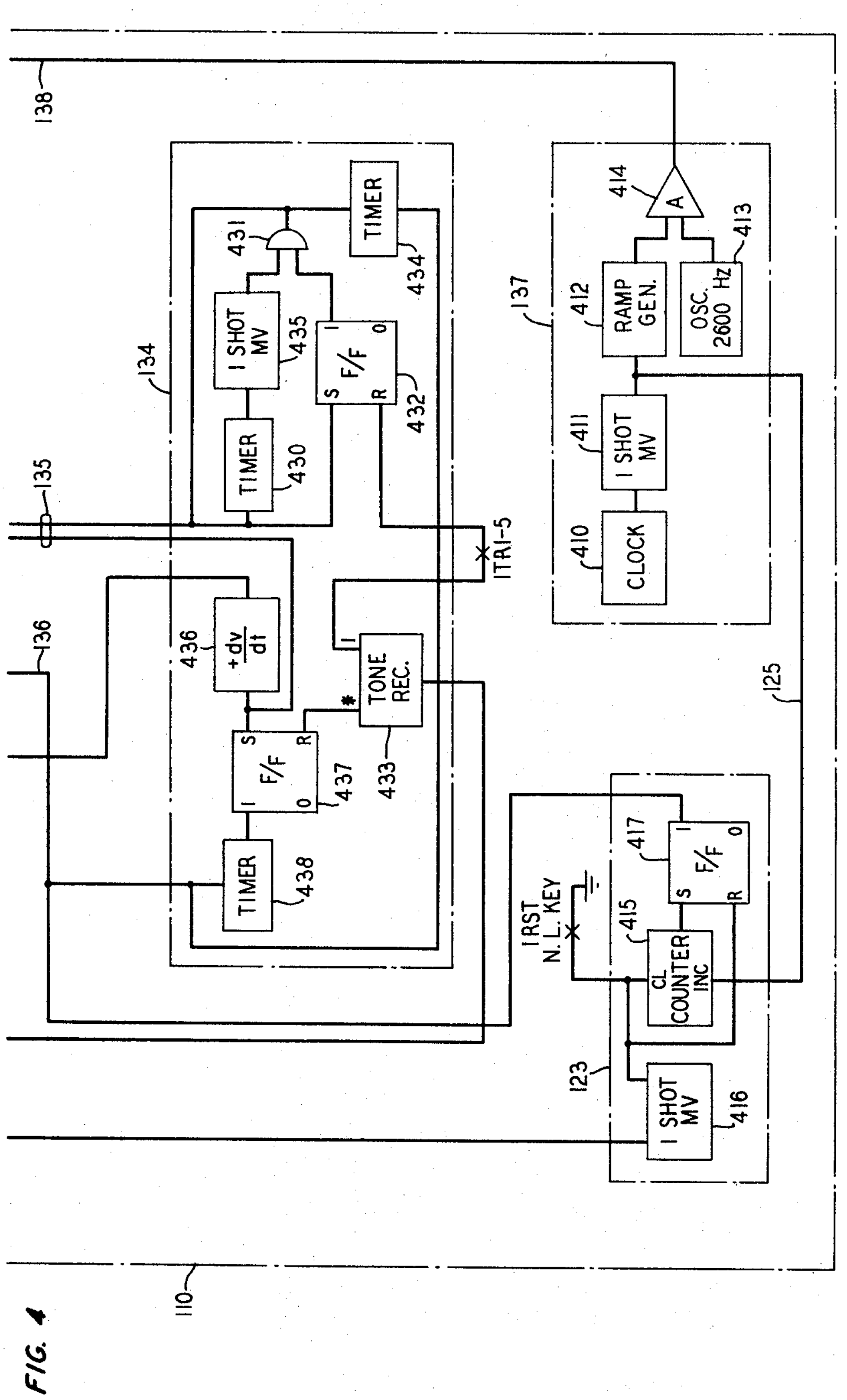
Figure 5:
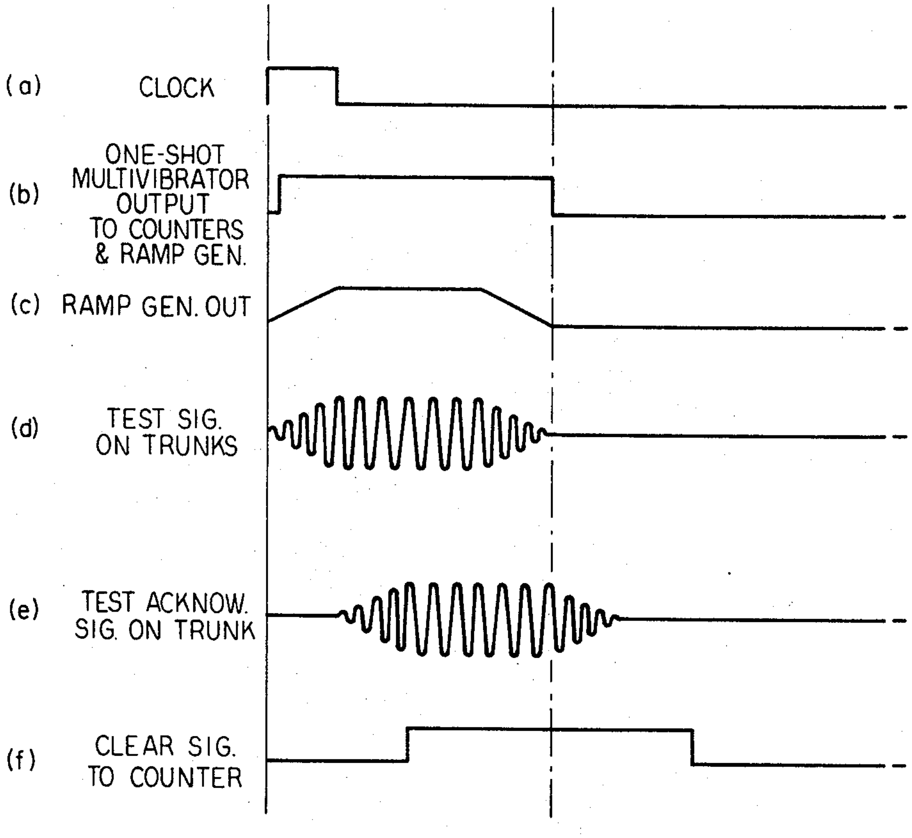
FIG. 5 is a diagram showing illustrative waveforms at strategic locations in the exemplary embodiment of our invention.
Figure 6:
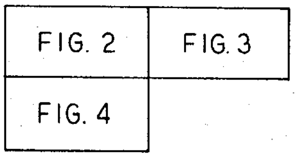
FIG. 6 shows the manner in which the other figures should be arranged to simplify tracing circuits.

Referring now to FIGS. 2, 3 and 4 arranged as shown in FIG. 6, the concurrent testing of trunks 112 and 113 is under the control of clocks 210 and 410 in test signal generators 114 and 137. Every three seconds clock 210 illustratively generates a short output pulse (FIG. 5a) which is converted to a 200 millisecond pulse (FIG. 5b) by one-shot multivibrator 211. The latter pulse is applied to ramp generator 212 for generating an output as shown in FIG. 5*c*. Amplifier 213 receives the generator 212 output and mixes it with a 2,400 Hz signal from oscillator 214 for producing the 2,400 Hz test signal (FIG. 5*d*) for transmission over trunk 112 to equipment 111. The purpose of shaping the envelope of each 2,400 Hz test signal (FIG. 5*d*) is gradually to increase the amplitude of leading edge and gradually decrease the trailing edge of each test signal to prevent objectionable or troublesome clicking noises that may otherwise potentially interfere with the voice frequency signals that are carried over trunk 112 or, alternatively, trunk 113.

Clock 410 also generates a pulse as shown in FIG. 5*a* every three seconds which causes generator 137 to produce a 200 millisecond test signal of 2,400 Hz tone identical to that produced by generator 114 and the signal is output on lead 138 to be carried over trunk 113 to equipment 111.

The output of multivibrator 211 is also carried on lead 215 to the incrementing input INC of counter 216 in integrity check circuit 122. Similarly, the output of multivibrator 411 is applied to incrementing input INC of counter 415 in check circuit 123. In response to the high to low transition at the end or trailing edge of the 200 millisecond pulse from multivibrators 211 and 411, counters 216 and 415 are incremented to a count of one, unless 2,600 Hz acknowledgment signals are received over trunks 112 and 113 from equipment 111 as later described. Each test acknowledgment signal is arranged to be received over a properly operating trunk within 200 milliseconds from the start of transmission of a test signal. The acknowledgment signal is applied to clearing input CL of the appropriate one of counters 216 and 415 where it blocks incrementation of the counter at the end of the test pulse applied to input INC. This testing cycle continues until a defect occurs in trunk 112 or 113 without interfering with communications carried over trunk 112.

Turning now to equipment 111 (FIG. 3) at the far end of trunks 112 and 113, the 2,600 Hz test signals transmitted over the trunks are detected and filtered from the communication paths by SF receivers 116 and 117, respectively. The voice frequency communications carried over the transmit pair of trunk 112 from the controller console pass through SF receiver 116 and the break contacts ITR2-3 to reach the remote site. Multivibrator 318 in acknowledgment signal generator 118 responds to the test signal detected by SF receivers 116 to produce a 200 millisecond output pulse. This pulse is applied to ramp generator 320 which generates the output shown in FIG. 5c. Amplifier 322 receives the output from ramp generator 320 and mixes it with a 2,600 Hz signal from oscillator 324 to produce the 2,600 Hz acknowledgment signal shown in FIG. 5c for transmission over trunk 112 to equipment 110. Similarly, generator 119 responds to the signal detected by SF receiver 117 to return an acknowledgment signal over trunk 113.

At the near end of trunks 112 and 113, the 2,600 Hz acknowledgment signals are detected and filtered from the communication paths by SF receivers 120 and 121. Voice frequency communications on trunk 112 from the remote site pass through SF receiver 120 and break contacts 1TR1-1 to reach the controller console. Multivibrators 218 and 416 respectively respond to the signals detected by SF receivers 120 and 121 to produce a 200 millisecond output pulse, as shown in FIG. 5*f*, which is respectively applied to the clearing inputs CL of counters 216 and 415. It should be noted by comparison of FIG. 5*b* and FIG. 5*f* that the pulse on clearing input CL of counters 216 and 415 is present when the previously described priming signal to input INC of these counters ends. As a result, counters 216 and 415 are not incremented to the count of one.

The previously described testing sequence is repeated every three seconds to check for a defect in trunk 112 or 113. Upon the occurrence of a defect, the 2,600 Hz test acknowledgment signal is not received by the appropriate one of SF receivers 120 and 121 and clearing input CL of the associated one of counters 216 and 415 is not high due to the presence of an acknowledgment signal when the incrementing input INC goes low at the end of the test signal. As a result, the particular counter is incremented to the count of one; then to a count of two for a second successive missing acknowledgment signal. Upon the incremenation of either counter 216 or 415 to the count of two, check circuit 122 or 123 provides an output which energizes alarm circuit 130 and, in addition, circuit 122 initiates automatic switching operations for trunk substitution if the trouble is in main trunk 112 or its associated testing equipment.

TROUBLE DETECTED IN THE SPARE TRUNK

The existence of trouble in trunk 113 or its associated testing equipment leaves the communications between the controller console CC and the remote site RS over trunk 112 unaffected and the priorly described testing sequence continues.

Counter 415 is incremented to the count of two as previously described and provides an output to switch flip-flop 417 to its set ("S") state when there is a defect in trunk 113. As a result the "1" output of flip-flop 417 is high and energizes alarm circuit 130 to alert maintenance personnel to the trouble. After clearing the trouble in trunk 113, key 1RST of FIG. 4 is operated to apply ground potential to clearing input CL of counter 415 and the reset input of flip-flop 417. This resets counter 415 to zero and causes flip-flop 417 to return its reset state with the "1" output low and alarm circuit 130 is deenergized.

TROUBLE DETECTED IN THE MAIN TRUNK

When trouble arises in trunk 112, the communication path between controller console CC and the remote site RS is disrupted until automatic trunk substitution reestablishes the communication path over trunk 113. Prior to a trouble condition on trunk 112, the output from counter 216 in check circuit 122 is low and accordingly the "J" input to JK flip-flop 223 is low. This output is inverted by inverter 222 to keep the "K" input of flip-flop 223 high. Accordingly, flip-flop 223 is in its "0" state with its "0" output high and its "1" output low.

A trouble condition in trunk 112 results in counter 216 being incremented to the count of two, as previously described, and the output of the counter is high. In response thereto, the "J" input of flip-flop 223 is high and its "1" output is high. Correspondingly, the "K" input and the "0" output of flip-flop 223 is low. The high "1" output of flip-flop 223 energizes alarm circuit 130 to alert maintenance personnel of the trouble on trunk 112 and initiates automatic substitution of trunk 113 for trunk 112. To accomplish automatic trunk substitution, transfer signal generator 131 is activated by flip-flop 223 to operate relay 1TR1 of FIG. 2 and to transmit a transfer signal over trunk 113. the trunk transfer signal is a sequence of two TOUCH-TONE signals advantageously utilized to prevent spurious frequencies appearing on trunk 113 from triggering trunk transfer at equipment 111.

The high "1" output of flip-flop 223 is applied to one of the two inputs of AND gate 224 and to *+dv/dt* circuit 225 which responds to the low to high transition of the "1" output of the flip-flop and generates a short pulse. The latter pulse passes through OR gate 240 to trigger one-shot multivibrator 226 which generates a 200-millisecond at the "*" input of tone sender 227 for, in turn, causing a 200-millisecond pulse of the first of the two TOUCH-TONE signals to be transmitted over trunk 113.

To generate the second TOUCH-TONE signal, the output of multivibrator 226 is delayed for 250 milliseconds by delay circuit 228, the output of which then energizes one-shot multivibrator 229 to generate a second 200 millisecond pulse 50 milliseconds later. The output of multivibrator 229 energizes a second input of AND gate 224 for 200 milliseconds. With both inputs of AND gate 224 energized the output is high and energizes the "1" input of sender 227. As a result, a 200 millisecond pulse of a TOUCH-TONE digit is transmitted over trunk 113.

The output of AND gate 224 also energizes winding L of latching relay 1TR1 to switch it from its unlatched state to its latched state. Break contacts 1TR1-1 and 1TR1-3 disconnect controller console CC from trunk 112 while make contacts 1TR1-2 and 1TR1-4 connect console CC to trunk 113.

While the transfer signal is being generated by generator 131, the pulse output from *+dv/dt* circuit 225 starts timer 430 in transfer and restore acknowledgment signal receiver 134 (FIG. 4). Once started, timer 430 completes a timing cycle of 100 milliseconds and then generates a pulse which energizes one-shot multivibrator 435 to produce a 2-second pulse which is applied to one of two inputs of AND gate 431. The other input of AND gate 431 is connected to the "1" output of flip-flop 432 which is initially in its reset or "0" state. The pulse that starts timer 430 also places flip-flop 432 in its set state making its "1" output high and, accordingly, the second input of AND gate 431 high. If a transfer acknowledgment signal is received over trunk 113 from equipment 111, as described hereinafter, flip-flop 432 is returned to its reset state before the end of the timing period of timer 430 and both inputs of AND gate 431 are not high at the same time. In the event an acknowledgment signal is not received, flip-flop 432 is not reset and when multivibrator 435 operates both inputs to AND gate 431 are high. the output of gate 431 is high for two seconds and causes retransmission of the transfer signal as described further in the specification.

TRUNK TRANSFER AT THE FAR END OF THE TRUNKS

AND ACKNOWLEDGMENT SIGNAL GENERATION

When there are no defects in equipment 110 and 111, the transmission of the transfer signal over trunk 113 to equipment 111 results in the operation of relay 1TR2 to effect the transfer of the communications path from trunk 112 to trunk 113 and the return of a transfer acknowledgment signal to equipment 110.

In FIG. 3, tone receiver 326 in transfer signal receiver 132 receives the coded transfer signal and generates a dc pulse output on the "*" output lead followed by a dc pulse output on its "1" output lead. The first pulse makes the J input of flip-flop 327 high while inverter 328 makes the K input low. Flip-flop 327, which is initially in its "0" state, does not immediately go to its "1" state, however, due to 125 millisecond timer 329 connected to clock input CLK of the flip-flop. Timer 329 is started and continues its timing function only so long as its input is held high. As input CLK to flip-flop 327 must be high while either the J or K input is high in order to place the flip-flop in its "1" or "0" state, the 125 millisecond timing period of timer 329 prevents spurious tones on trunk 113 from initiating trunk transfer at equipment 111.

In response to a valid transfer signal, the "*" and "1" pulse outputs of tone receiver 326 are high for a period in excess of 175 milliseconds and this is sufficient time for timer 329 to time out and make input CLK of flip-flop 327 high while its J input is also high. This results in flip-flop 327 being placed in its "1" state. The "1" output of flip-flop 327 energizes one-shot multivibrator 330 which provides a 300 millisecond pulse to one of the two inputs of AND gates 331 and 332. The 300 millisecond pulse is also applied to *–dv/dt* circuit 333 which responds to the high-to-low transition at the end of the pulse and generates a pulse used to clear flip-flop 327 as hereinafter explained.

The "1" output of receiver 326 goes high in response to the transfer signal and makes the second input of AND gate 331 high. With both inputs high, the output of AND gate 331 is high and energizes terminal L of latching relay 1TR2 to place the relay in its latched state. Contacts of relay 1TR2 perform two functions. First, break contacts 1TR2-1 and 1TR2-3 disconnect the remote site from trunk 112 while make contacts 1TR2-2 and 1TR2-4 connect the remote site to spare trunk 113. Second, make contact 1TR2-5 connects the high "1" output of tone receiver 326 to the second input of AND gate 332. With both inputs of AND gate 332 high, its output is high and energizes one-shot multivibrator 334 to produce a 200 millisecond pulse. The latter pulse energizes the "1" input of tone sender 335 which transmits a 200 millisecond pulse of the TOUCH-TONE digit "1" over trunk 113 to equipment 110 for acknowledging that transfer has been completed at equipment 111.

The 300 millisecond pulse from multivibrator 330 ends after multivibrator 334 has been energized and the positive to negative transition of its trailing edge is detected by *–dv/dt* circuit 333 which generates a pulse at clearing input CLR of flip-flop 327 to return the flip-flop to its "0" state for awaiting a receipt of another trunk transfer signal.

RECEIPT OF TRANSFER ACKNOWLEDGMENT SIGNAL

Returning now to FIGS. 2 and 4, tone receiver 433 is responsive to a received transfer acknowledgment signal returned over trunk 113 for generating a dc pulse on its "1" output for passage through the now closed make contact 1TR1-5 to reset flip-flop 432 to its "0" state. This occurs before timer 430 times out and, as a result, both inputs of AND gate 431 are not high at the same time. Thus, there is no output from AND gate 431 to trigger a retrial at trunk transfer as is discussed hereinafter.

TRUNK TRANSFER RETRIAL

When a transfer acknowledgment signal is not received over trunk 113 from equipment 111, the transfer signal is transmitted a second time over trunk 113 under control of circuit 131. Failure of circuit 134 to receive an acknowledgment signal in response to the second transfer signal causes a trouble signal to be generated to alert the maintenance personnel of a failure to transfer.

Upon failure of receiver 433 in circuit 134 to receive an acknowledgment signal in response to the first transfer signal no output is provided from the receiver to reset flip-flop 432. Thus the "1" output of flip-flop 432 remains high and timer 430 times out and energizes multivibrator 435 to make the second input of AND gate 431 high. The high output of AND gate 431 is connected through OR gate 240 to multivibrator 226 which produces a 200 millisecond pulse that causes a second transmission of the coded trunk transfer signal in the manner previously described. The high output of AND gate 431 also starts timer 434 which produces a pulse after a timing period within which a transfer acknowledgment signal should be received in response to the second transfer signal. Timer 434 stops its timing function if its input becomes low in response to an acknowledgment signal before it has timed out.

Equipment 111 at the far end of trunk 113 receives the second transfer signal, attempts trunk substitution, and returns an acknowledgment signal upon successful substitution; all as previously described. Receipt of the acknowledgment signal by circuit 134 results in flip-flop 432 being reset, as previously described, and its "1" output connected to "1" input of AND gate 431 is low. This in turn causes the output of AND gate 431 to be low which disables timer 434 before it has timed out.

Upon failure to receive an acknowledgment signal on retrial, the "1" output of flip-flop 432 stays high which causes the output of AND gate 431 to remain high for the 2 second period that multivibrator 435 keeps the other input of the gate high. As a result, the input of timer 434 is held high for 2 seconds and it times out and generates a pulse to energize alarm circuit 130 which alerts the maintenance personnel that automatic trunk substitution has failed.

RESTORAL OF MAIN DEDICATED TRUNK

Once the maintenance personnel have eliminated a trouble in main trunk 112 key 1RMT is operated to effect resubstitution of trunk 112 for trunk 113 and to restore normal testing of trunk 112 by clearing counter 216 associated therewith.

A contact of operated key 1RMT applies ground potential to clearing input CL of counter 216 in check circuit 122 to reset the counter to its "0" state. In addition the ground potential is applied to clearing input CLR of flip-flop 223 to return the flip-flop to its "0" state. As flip-flop 223 changes to its "0" state its "0" output undergoes a low to high transition to which *+dv/dt* circuit 436 responds and generates a pulse. The pulse from circuit 436 is used to effect substitution of trunk 112 for trunk 113 at both the near and far ends of the trunks. To accomplish substitution the pulse from circuit 436 is applied via OR gate 240 to one-shot multivibrator 226 which generates a 200 millisecond pulse in response thereto. The latter pulse energizes the "*" input of tone sender 227 and a 200 millisecond TOUCH-TONE signal pulse is transmitted over trunk 113 to equipment 111 to effect resubstitution at the far end of the trunks. The latter pulse also energizes winding terminal U on latching relay 1TR1 to return relay 1TR1 to its unlatched state to effect resubstitution at the near end of the trunks.

The pulse generated by *+dv/dt* circuit 436 also energizes the "*s*" input of flip-flop 437 the "1" output of which becomes high and starts timer 438 connected thereto. Timer 438 continues its timing function only as long as its input is held high and when it times out it produces a pulse to energize alarm circuit 130. The timing period of timer 438 is 500 milliseconds which allows a trunk restoral signal to be transmitted to equipment 111 at the far end of trunk 113, and a restoral acknowledgment signal to be returned to equipment 110. The receipt of the restoral acknowledgment signal by receiver 134 causes flip-flop 437 to return to its "0" state and, as a result, timer 438 is reset before it times out, as described hereinafter.

At equipment 111 the restoral signal is received by tone receiver 326 which generates a dc pulse on its "*" output in response thereto. The pulse output from receiver 326 is used to concurrently release latching relay 1TR2 which effects resubstitution of the far end and to return a restoral acknowledgment signal over trunk 113 to equipment 110. To release relay 1TR2 the pulse from receiver 326 is amplified by amplifier 338 to energize terminal U on relay 1TR2 which returns to its unlatched state. For the generation of the acknowledgment signal, the pulse from receiver 326 passes through the still closed make contact 1TR2-6 to energize oneshot multivibrator 337 in generator 133. Multivibrator 337 produces a 200 millisecond output pulse which energizes the "*" input of tone sender 335, causing transmission of a 200 millisecond pulse of the appropriate TOUCH-TONE signal over trunk 113 to equipment 110 to acknowledge resubstitution.

The restoral acknowledgment signal returned over trunk 113 is received by tone receiver 433 which generates a dc pulse on its "*" output. In response to this pulse flip-flop 437 is returned to its reset state where its "1" output is low and timer 438 is stopped. In the event the acknowledgment signal is not received by receiver 433 there is no output therefrom to return flip-flop 437 to its "0" state. The input to timer 438 is held high by the "1" output of flip-flop 437 and the timer completes its timing period and energizes alarm circuit 130 to alert the maintenance personnel to a failure to restore trouble condition.

Upon release of the latching relays at equipment 110 and 111, the communication path between controller console CC and remote site RS is reestablished over main trunk 112 and testing of trunks 112 and 113 takes place as priorly described.

While the equipments of this invention have been described with reference to a particular embodiment, it is to be understood that such an embodiment is intended to be illustrative of the principles of the invention and numerous other arrangements may be devised by those skilled in the art without departing from the spirit and scope of the invention.

The invention disclosed and claimed in this application is related to an invention disclosed in an application of R. J. Angner and P. P. Daniele, Ser. No. 214,140, filed concurrently with this application.

What is claimed is:

1. An arrangement for maintaining the integrity of a communications path between two terminal locations through a trunk means comprising a spare trunk, means operable for substituting said spare trunk for said trunk means, means at a first one of said locations for transmitting a series of first timed pulse signals over said trunk means to said second location, means at said second one of said locations responsive to a receipt of each of said first signals for sending a second timed pulse signal over said trunk means to said first location, integrity check means at said first location and including means checking the receipt of each of said second signals, and means controlled by said check means in the absence of a predetermined plurality of said second signals sent over said trunk means for operating said substituting means.

2. the invention in accordance with claim 1 wherein said checking means includes means for counting to a predetermined plural count under control of said transmitting means and in response to the absence of received second signals at said first location.

3. The invention in accordance with claim 2 wherein said substituting means comprises individual switch means at each of said locations, said counting means controlling the energization of said switch means at said first location to effect the substitution of said spare trunk for said trunk means thereat upon said counting means counting to said predetermined plural count, means concurrently controlled by said counting means for effecting the transmission of a transfer signal over said spare trunk to said second location, and means responsive to the receipt of said transfer signal for operating said switch means at said second location to effect the substitution of said spare trunk for said trunk means thereat.

4. The invention in accordance with claim 3 wherein each of said first timed pulse signals comprises a first prescribed tone signal of a first prescribed frequency and each of said second timed pulse signals comprises a second prescribed tone signal of another prescribed frequency for distinguishing between said first and second signals on said trunk means, and further comprising means cooperating with said transmitting means for incrementing said counting means to effect said counting, and means responsive to said second tone signal to recycle said counting means.

5. The invention in accordance with claim 3 further comprising means for transmitting a transfer acknowledgment signal over said spare trunk to said first location responsive to the operation of said switch means at said second location, and alarm means primed by said acknowledgment signal transmitting means to be operated to indicate a failure to substitute said spare trunk for said trunk means a predetermined time after the transmission of said transfer signal over said spare trunk, and said alarm means operation being canceled by the receipt of said acknowledgment signal.

6. The invention in accordance with claim 5 further comprising means operated after a defect in said trunk means is cleared for automatically releasing said substituting means to effect the substitution of said trunk means for said spare trunk.

7. Equipment for checking a plurality of communication paths comprising means applying a series of first signals to one end of each of said paths, means for returning a second signal over each of said paths in response to a receipt of each of said first signals, means individual to each one of said paths at said one end thereof for indicating a trouble condition in the absence of a receipt of a predetermined number of said second signals at said one end of said paths, and switch means at said one end of said paths responsive to a trouble indication from said indicating means associated with a first one of said paths for transferring communication signals carried on said first path to a second one of said paths.

8. The invention in accordance with claim 7 wherein said transferring means further comprises switch means at said other end of said first and second paths for transferring communication signals carried on said first path to said second path at said other end, means applying a transfer signal to said second path in response to said indicating means indicating a trouble condition, and means for operating said switch means responsive to the receipt of said transfer signal at said other end of said second path.

* * * * *